United States Patent [19]

Filer

[11] 4,280,274
[45] Jul. 28, 1981

[54] TUBE EXTRACTING APPARATUS

[75] Inventor: Burt Filer, New Hope, Pa.

[73] Assignee: Sandra Lee Filer, New Hope, Pa.

[21] Appl. No.: 117,309

[22] Filed: Jan. 31, 1980

[51] Int. Cl.³ .............................................. B23P 19/00
[52] U.S. Cl. ....................................... 29/726; 29/263
[58] Field of Search ............... 29/263, 264, 255, 256, 29/726, 282; 81/3 G, 53.2

[56] References Cited

U.S. PATENT DOCUMENTS

| 1,382,835 | 6/1921 | Johnson | 29/263 |
|---|---|---|---|
| 2,487,331 | 11/1949 | Greene | 29/264 |
| 2,916,813 | 12/1959 | Belanger | 29/264 X |
| 3,120,700 | 2/1964 | Chuplis | 29/726 |
| 3,507,028 | 4/1970 | Stellatella | 29/726 |
| 3,613,212 | 10/1971 | Miller | 29/263 X |
| 3,835,520 | 9/1974 | Sismore | 29/726 |
| 4,095,335 | 6/1978 | Lassarat | 29/726 |

*Primary Examiner*—Jimmy C. Peters
*Attorney, Agent, or Firm*—Zachary T. Wobensmith, 2nd; Zachary T. Wobensmith, III

[57] ABSTRACT

Apparatus for extracting tubes from the tube sheets of a heat exchanger is provided which is particularly suitable for the removal of tubes of small internal diameter and which includes a tube pulling dart having a tapered threaded end for engagement within the tube and a sleeve secured thereto for automatic attachment of a power operated pulling mechanism. The threads on the dart preferably have a right triangular cross section with vertical faces for applying the load from the threads onto the tube to be extracted. In another embodiment the attachment is manual.

9 Claims, 11 Drawing Figures

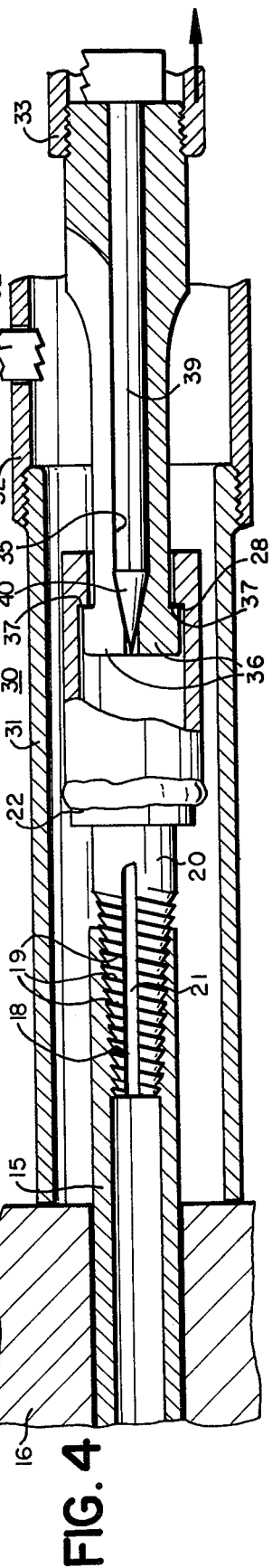

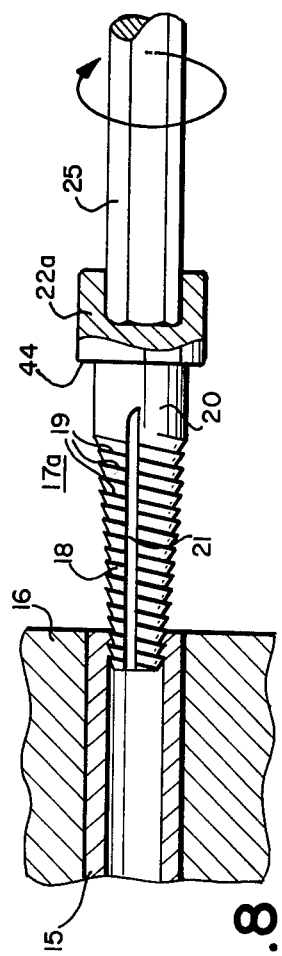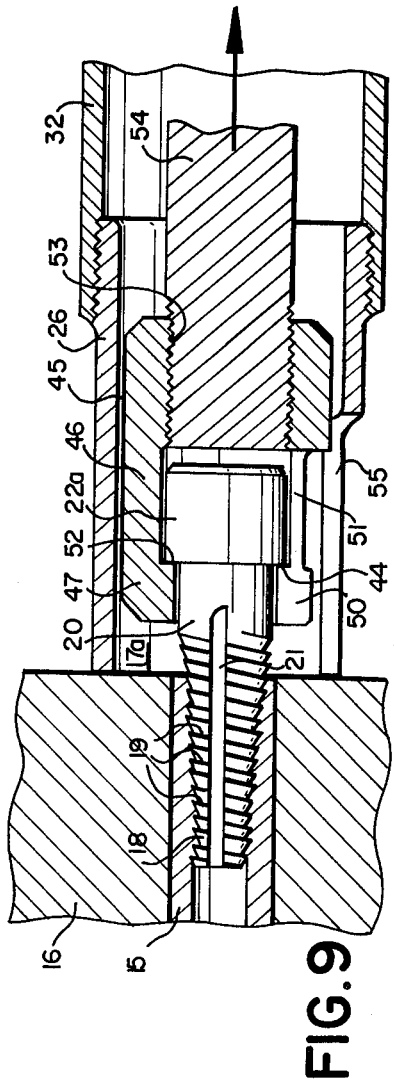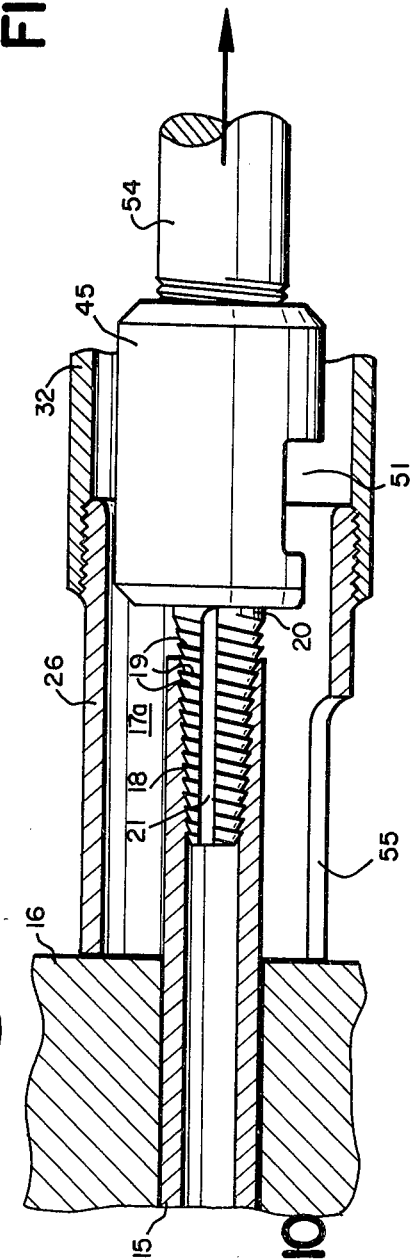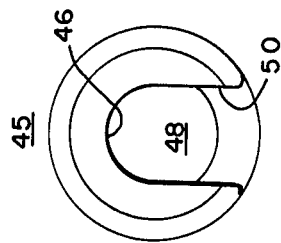

TUBE EXTRACTING APPARATUS

BACKGROUND OF THE INVENTION

1. Field of the Invention

This invention relates to apparatus for extracting tubes from the tube sheets of heat exchangers.

2. Description of the Prior Art

It is heretofore been proposed to provide a tube pulling spear externally threaded at one end for tube engagement with an internally threaded portion at the outer end for the reception of an extension rod to which a pulling mechanism can be connected.

Miller, in U.S. Pat. No. 3,613,212 shows a straight sided tap with a threaded end portion 12 and an elongated shank portion 13, the threads on the end portion being outwardly inclined as at 27 and 31 as shown in the drawings for contraction of the side wall of the tube. The other and outermost end of the shank portion 12 is threaded and has a head 20 for the reception of a tool for threading the tap into the tube to be withdrawn.

A nut 17 is provided for threaded engagement with the threaded outer end of the shank 13 with the spacer sleeve 15 interposed between the nut 17 and the tube sheet. The nut 17 has a socket extension 25 for connection to an impact wrench for rotation of the nut 17 for tube withdrawal.

Chuplis, in U.S. Pat. No. 3,120,700, shows a tube puller which includes a jack nut 2 with one end for engagement with the tube sheet and having an elongated internally threaded axial bore 4 therethrough with a hexagonal head 6 at the other end for engagement and turning by an impact wrench. A tap 8 is provided in the shape of an elongated stud with an externally threaded portion 10 for engagement in the bore 4, and an integral hexagonal head 16. A threaded tap 12 of reduced diameter is shown as of uniform diameter with a tapered entrance and an integral tap pilot 14. A tap driver 18 is employed having a shank 20 and a socket 22 for engagement with the head 16 for insertion of the tap portion 12 into the tube as shown in FIG. 3. The tap driver 18 is withdrawn and further turning of the head 6 of the jack nut 2 effects retraction of the tube as shown in FIGS. 4 and 5. FIG. 6 shows a modified form of jack nut 2' which includes a bearing 26.

Lassarat, in U.S. Pat. No. 4,095,335, shows an automatic tube puller which includes a threaded mandrel 48 which is screwed into a heat exchanger tube 50 by an impact tool or ratchet wrench after which the pulling device is applied to the mandrel for retraction of the mandrel 48 and the tube 50 with which the mandrel is engaged. The pulling device has an adapter tube 46 to engage the tube sheet. The threaded portion of the mandrel engageable with the tube is shown as of uniform diameter.

The devices heretofore available have various shortcomings. The Chuplis and Miller devices have straight sided taps which are threaded into the tube to be withdrawn by torque applied to exterior surfaces of a bolt head, the tap and tube being withdrawn by a jack screw utilizing a second set of screws on the back of the tap. While these devices are effective they are slow and awkward to use, require several manual operations and are not suited for use with hydraulic power pulling mechanisms. The length of the taps and their cylindrical cutting threads make it difficult to drive them in straight. This is critical since, because of the high force required for tube withdrawal, the extraction forces applied, particularly on elongated shanks and the like, and angular misalignment even slightly off center causes tap breakage. The greater the length the greater the offset for a given angular misalignment. In practice, also, many operators tend to drive the tap in too far with resultant tightening of the tube into the tube sheet.

The Lassarat device is alo subject to problems of misalignment and over driving as well as the difficulty of manually fitting the pulling device over the mandrel.

The structures heretofore available, also, because of their length are relatively complex and expensive and subject to tap breakage.

SUMMARY OF THE INVENTION

In accordance with the invention a tube extractor for heat exchangers is provided which includes a tube pulling dart of minimal overall length having a short tapered threaded end for engagement in a tube and with an interior socket for positioning of the threaded end in the tube and with a sleeve which is permanently secured in one embodiment and having an internal shoulder for gripping by a hydraulic tube extractor or which is detachably secured in another embodiment for manual engagement.

It is the principal object of the invention to provide a tube extracting member which is self-aligning and which has a minimal overall length to greatly reduce the tendency to breakage.

It is a further object of the invention to provide a tube extracting member which is light in weight and easy to use.

It is a further object of the invention to provide a tube extracting member which has relatively small driving surfaces which prevent overtightening.

It is a further object of the invention to provide a tube extracting member which in one embodiment can be readily gripped and actuated by a power operated pulling device.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which:

FIG. 1 is a longitudinal sectional view of a dart for tube extraction for insertion into a tube by rotation of a hexagonal key;

FIG. 2 is a view similar to FIG. 1 with the dart inserted to a position for tube extraction and with a hydraulic tube extractor in position for expansion of a collet for applying an extracting force;

FIG. 3 is a view similar to FIG. 2 but with the collet in expanded condition for withdrawal of the tube;

FIG. 4 is a view similar to FIG. 3 but showing the tube withdrawn from the tube sheet;

FIG. 5 is an end view of the dart as seen from the left of FIG. 1;

FIG. 6 is an end view of the tip of the collet as seen from the left in FIG. 2;

FIG. 7 is an end view of the collet as seen from the left in FIG. 3;

FIG. 8 is a longitudinal sectional view of another embodiment of the invention and showing a configuration of dart suitable for engagement by a manual with-drawing device with the dart partially introduced into the tube to be withdrawn;

FIG. 9 is a view similar to FIG. 8 with the dart in a position for tube withdrawal and with a knuckle applied for withdrawal;

FIG. 10 is a view similar to FIGS. 8 and 9 with the tube withdrawn from the tube sheet; and FIG. 11 is an end view of the knuckle as seen from the left in FIGS. 9 and 10.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENTS

Referring now more particularly to the drawings tube extracting apparatus for removal of heat exchanger tubes from a tube sheet is there illustrated in which an end portion of a tube 15 is shown in engagement in a tube sheet 16.

The extracting appartus includes a dart 17 having a tapered end portion 18 with threads 19, preferably not exceeding three inches in length. The small end of the dart 17 is sized so that it can just enter the interior of the tube 15 to be extracted and the shank 20 is of slightly less than the outside diameter of the tube 15. While any suitable contour of threads can be employed it is preferred that the threads be of the buttress type, i.e. with a right triangular cross section and having a vertical face in a plane transverse to the longitudinal axis of the tube 15 to present the best force application for tensile loading. On each side of the tapered portion 18 flutes 21 are provided to aid in the driving of the dart 17 into the tube 16 with minimal torque.

The dart 17 has an enlarged head 22 preferably integral therewith with a socket 23, preferably having hexagonal driving surfaces 24 for reception of a complemental driving key 25 to facilitate insertion of the dart 17 into the tube 15.

The space limitations imposed on the socket 23 prevents the application of excessive force at this location by the key 25 and thereby reduces the tendency to overinsertion.

In the form of the invention shown in FIGS. 1 to 7, inclusive, the head 22 is secured to an annular sleeve 26 extending coaxially therefrom with the end portion providing an internal shoulder 28 and having an end bore 27 for reception of the key 25.

This form of the invention is particularly suited for employment of a hydraulic tube extractor 30 of known type. The tube extractor includes a tubular force applying member 31 which abuts against the exterior face of the tube sheet 16 and which is carried by the housing 32 of the extractor 30.

The tube extractor 30 has a power pulling portion 33 which carries a collet 34. The collet 34 has an internal bore 35 with a plurality of radially flexible fingers 36. The collet fingers 36 have shoulders 37 for engagement with the shoulder 28.

The bore 35 at its innermost end is constructed to provide interior nibs 38.

A mandrel 39 is provided slidably mounted in the bore 35 and movable therealong in a well known manner and having a conical tip 40 for engagement with the nibs 38 to force the fingers 36 outwardly and to bring the shoulders 36 into position for engagement with the shoulder 28. The rear end of the mandrel 39 is actuated by clutch members C1 and C2. A mating member 41 slidably engaging the housing 32 is actuated in the desired relation to the power pulling portion 33.

The mode of operation is illustrated in FIGS. 1 to 6, the first operation being the insertion of the dart 17 into the tube 15 by use of the key 25 which is then removed. Then the tube extractor 30 is brought into use with the tubular member 31 engaged with the outer face of the tube sheet as shown in FIG. 2. The mandrel 39 is held stationary as the collet 34 is advanced, which causes the collet fingers 36 outwardly to position the shoulder 37 for engagement with the shoulder 28, as shown in FIG. 3, to withdraw the tube 15. Upon completion of the withdrawal of the tube 15, as shown in FIG. 4, the nibs 38 can be retracted from their engagement with the mandrel 39, on the return cycle of the tube extractor 30, for separation of the collet fingers 36 from engagement with the shoulder 28, and for separation of the tube extractor 30.

In the form of the invention shown in FIGS. 8 to 11, inclusive, the dart 17a is similar to that previously described with a shank 20 having an enlarged head 22a with a socket 23 as before and with an external shoulder 44. A knuckle 45 is provided, in the form of a hollow cylinder 46 having an end closure 47 with a slot 48, curved at its upper end as at 49, and with a vertically extending portion 50 open at the bottom and with a rearward extension 51 for mounting the knuckle 45 on the dart 17a. The interior of the closure 47 has a shoulder 52 for engagement with the shoulder 44 for exerting a pulling force on the dart 17a.

The cylinder 46 at the other end has an internally threaded opening 53 for engagement by a threaded rod 54 actuated for power pulling by a hydraulic cylinder (not shown) with a sleeve 36 engaging the outer face of the tube sheet 16. The sleeve 26 has a lower slot 55 for application of the sleeve 26.

The mode of operation is illustrated in FIGS. 8 to 11, inclusive, the dart 17a being inserted, as before, into the tube 15 by the use of the key 25.

The pulling apparatus is then applied with the knuckle 45 engaged on the head 22a, with the sleeve 26 abutting the outer face of the tube sheet 16, as shown in FIG. 9. Upon the application of pulling force on the rod 54 the tube 15 is extracted as shown in FIG. 10.

The dart 17 or 17a is strong, with a reduced likelihood of overinsertion in the tube 15.

I claim:

1. Tube extracting apparatus for extracting a tube from a tube sheet comprising
    a dart having a shank and a tapered end extending therefrom in axial alignment,
    said tapered end being provided with threads for internal engagement in a tube to be extracted, p1 said tapered end having longitudinal flutes for facilitating insertion of said threaded tapered end,
    said shank opposite said tapered end having an enlarged head,
    said head opposite said shank having a socket axially aligned with said shank and being provided with internal driving surfaces for rotation of said threaded tapered end into the tube to be extracted.

2. Tube extracting apparatus as defined in claim 1 in which
    said socket is hexagonal.

3. Tube extracting apparatus as defined in claim 1 in which
said tapered threaded end is of a length not exceeding three inches.

4. Tube extracting apparatus as defined in claim 1 in which
said diameter of the shank is slightly less than the outside diameter of the tube to be extracted.

5. Tube extracting apparatus as defined in claim 1 in which
said threads have a right triangular cross section with a vertical face transverse to the longitudinal axis of the dart.

6. Tube extracting apparatus as defined in claim 1 in which
said head has a tubular member extending therefrom with the opposite end provided with an internal shoulder for force application thereon for tube withdrawal.

7. Tube extracting apparatus as defined in claim 6 in which
means is provided for engagement with said shoulder for pulling said dart for tube extraction,
said means including a member for abutting engagement with the face of the tube sheet.

8. Tube extracting apparatus as defined in claim 1 in which
said head has a shoulder in facing relation to the tube sheet, and
knuckle means is provided for detachable engagement with said head.

9. Tube extracting apparatus as defined in claim 8 in which
said knuckle means has an interior shoulder for engagement with the shoulder on said head.

* * * * *

UNITED STATES PATENT AND TRADEMARK OFFICE
CERTIFICATE OF CORRECTION

PATENT NO. : 4,280,274
DATED : July 28, 1981
INVENTOR(S) : Burt Filer

It is certified that error appears in the above—identified patent and that said Letters Patent is hereby corrected as shown below:

Column 4,

Line 57, after "extracted," delete - pl -

Signed and Sealed this

Twenty-second Day of September 1981

[SEAL]

Attest:

Attesting Officer

GERALD J. MOSSINGHOFF
Commissioner of Patents and Trademarks